United States Patent
Berner et al.

(10) Patent No.: US 9,290,072 B2
(45) Date of Patent: Mar. 22, 2016

(54) ARRANGEMENT FOR HOLDING A FIRST FASTENING ELEMENT AND A SECOND FASTENING ELEMENT ON AN AXLE ELEMENT FOR A MOTOR VEHICLE AXLE

(75) Inventors: Matthias Berner, Stuttgart (DE); Tycho Eulenstein, Kassel (DE); Andreas Ottmueller, Kornwestheim (DE); Rudolf Reinhardt, Esslingen (DE); Petra Schulz, Esslingen (DE); Alexander Theierl, Vaihingen-Ensingen (DE); Lena Thome, Kassel (DE)

(73) Assignee: Daimler AG, Stuttgart (DE)

( * ) Notice: Subject to any disclaimer, the term of this patent is extended or adjusted under 35 U.S.C. 154(b) by 21 days.

(21) Appl. No.: 14/236,512

(22) PCT Filed: Jul. 31, 2012

(86) PCT No.: PCT/EP2012/003257
§ 371 (c)(1),
(2), (4) Date: Jan. 31, 2014

(87) PCT Pub. No.: WO2013/017266
PCT Pub. Date: Feb. 7, 2013

(65) Prior Publication Data
US 2014/0151945 A1 Jun. 5, 2014

(30) Foreign Application Priority Data
Aug. 3, 2011 (DE) .......................... 10 2011 109 350

(51) Int. Cl.
*B60B 35/00* (2006.01)
*B60G 11/113* (2006.01)

(52) U.S. Cl.
CPC .............. *B60G 11/113* (2013.01); *B60B 35/00* (2013.01); *B60B 35/007* (2013.01);
(Continued)

(58) Field of Classification Search
CPC .......... B60B 35/007–35/008; B60B 2310/302; B60B 2310/311; B60G 11/13; B60G 11/131
See application file for complete search history.

(56) References Cited

U.S. PATENT DOCUMENTS 1,908,856 A * 5/1933 Mogford .............. B60G 11/113
267/52
2,174,320 A * 9/1939 Gonard ........................... 267/52
(Continued)

FOREIGN PATENT DOCUMENTS

DE 198 56 706 C1 4/2000
GB 2010758 A * 7/1979
(Continued)

OTHER PUBLICATIONS

International Search Report dated Nov. 21, 2012 w/ English translation (four (4) pages).
(Continued)

*Primary Examiner* — Anna Momper
(74) *Attorney, Agent, or Firm* — Crowell & Moring LLP

(57) ABSTRACT

In an arrangement for holding a first fastening element and a second fastening element on an axle element for an axle of a motor vehicle, in particular of a utility vehicle, the first fastening element arranged on a first side of the axle element and intended to support a spring mechanism of the axle is held on the axle element. The second fastening element is arranged on a second side of the axle element facing away from the first side and is used to support a bracket engaging, at least partially, around the axle element and intended for fastening the spring mechanism on the axle element is held on the axle element. At least one of the fastening elements is joined to the axle element by a welding rivet.

7 Claims, 4 Drawing Sheets

Figure 9:
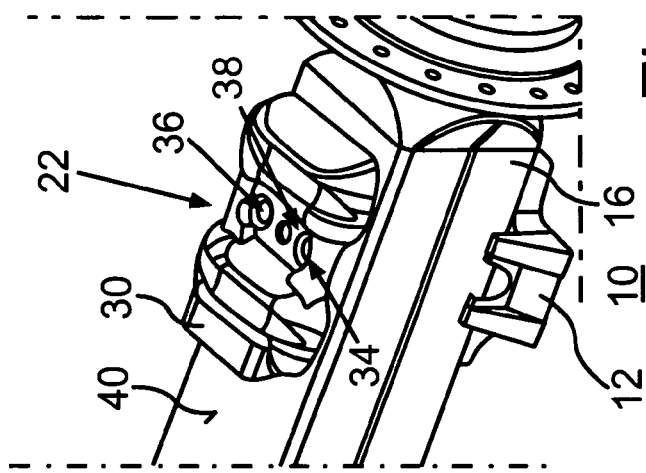

(52) U.S. Cl.
CPC .... *B60B 2310/302* (2013.01); *B60B 2310/311* (2013.01); *B60B 2320/50* (2013.01); *B60B 2900/113* (2013.01); *B60Y 2200/14* (2013.01)

(56) References Cited

U.S. PATENT DOCUMENTS

| | | | |
|---|---|---|---|
| 3,386,724 | A | 6/1968 | Tantlinger et al. |
| 3,437,333 | A | 4/1969 | Koch et al. |
| 6,406,044 | B1 | 6/2002 | Wisotzky |
| 2014/0356101 | A1 | 12/2014 | Bassler et al. |

FOREIGN PATENT DOCUMENTS

| | | |
|---|---|---|
| JP | 2008-49878 A | 3/2008 |
| JP | 2011-519727 | 7/2011 |
| WO | WO 2009/135553 A1 | 11/2009 |

OTHER PUBLICATIONS

International Written Opinion dated Nov. 21, 2012 (six (6) pages).
Japanese Office Action dated Mar. 10, 2015, with partial English translation (three (3) pages).

* cited by examiner

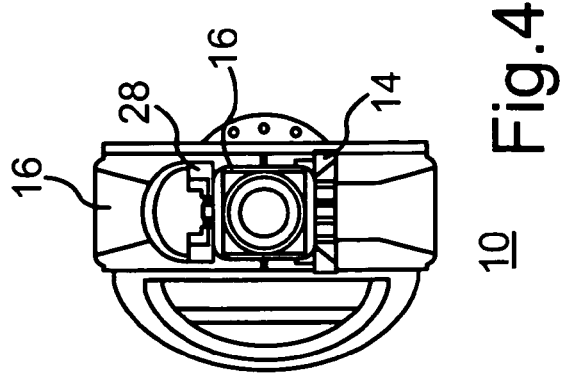
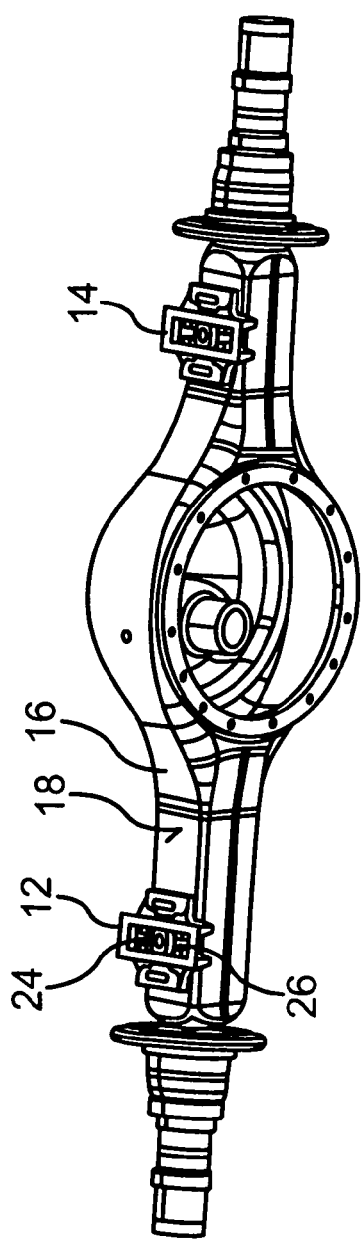
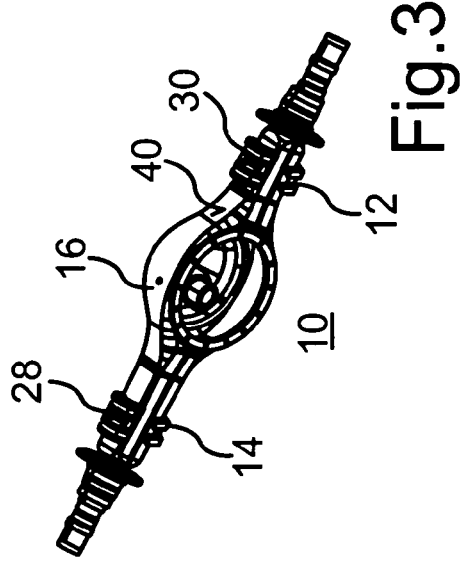
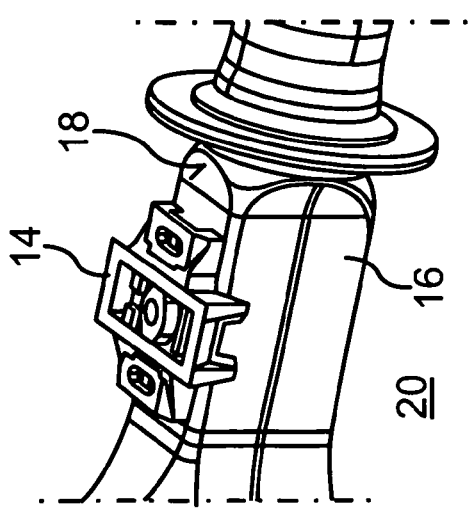

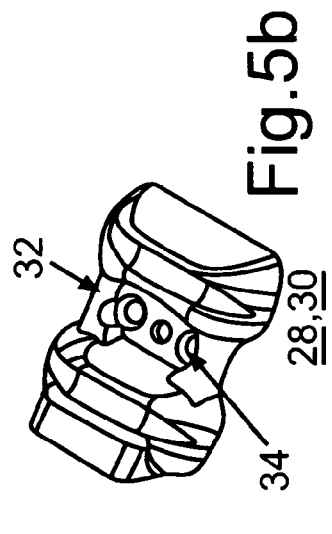
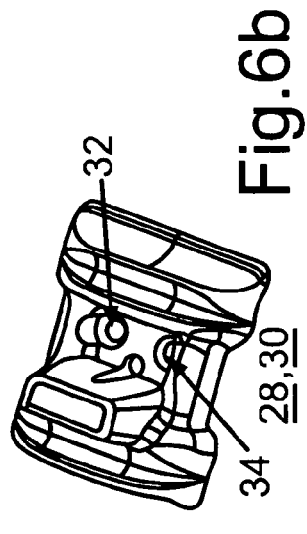
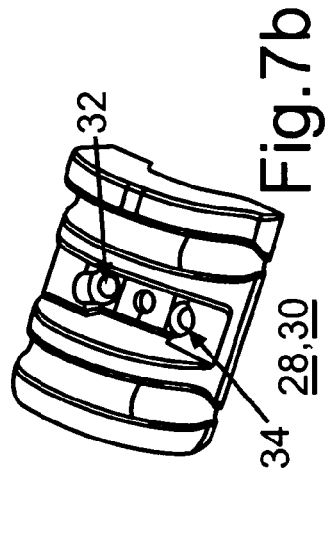
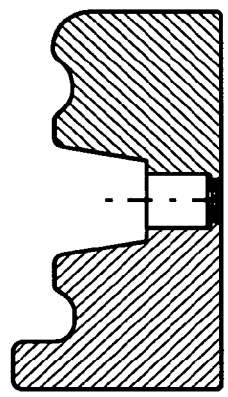
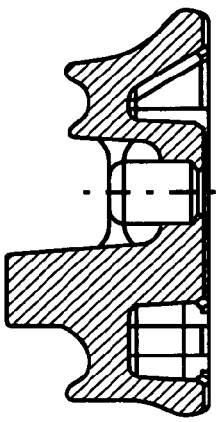
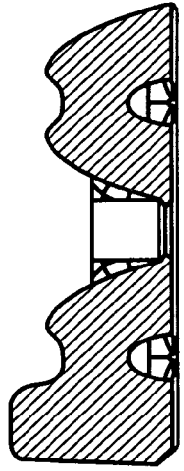

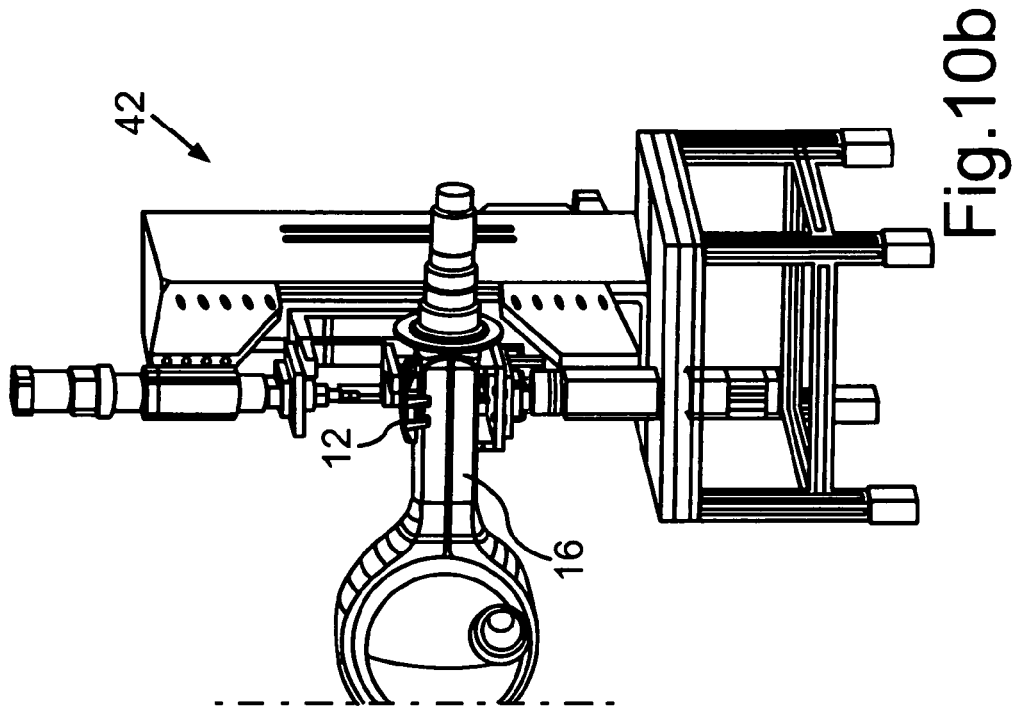
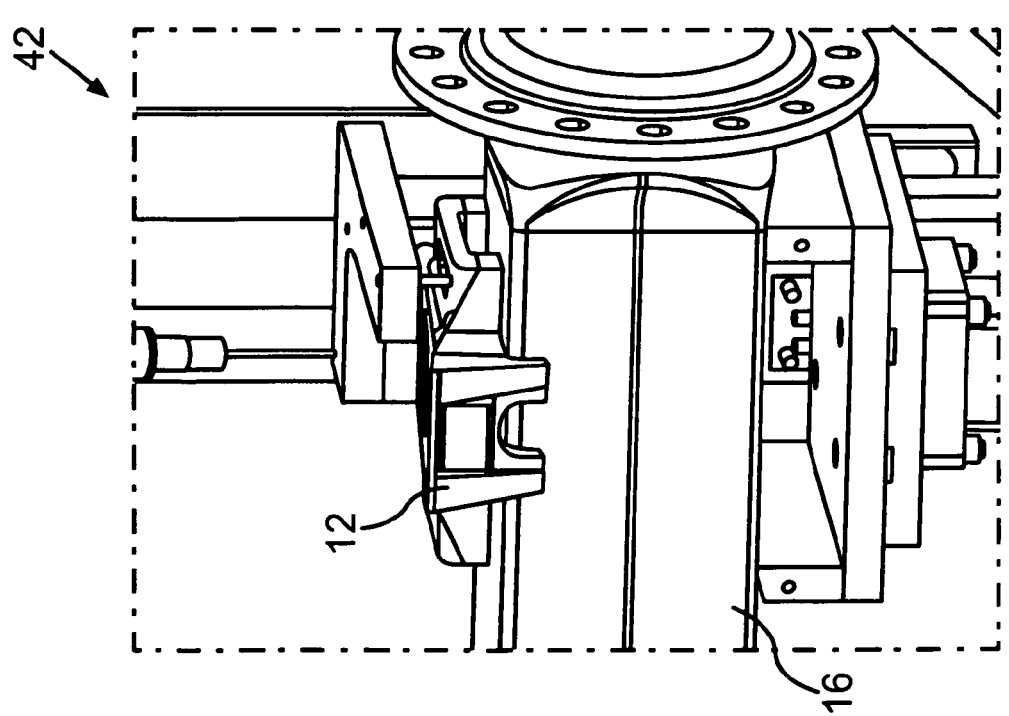

ARRANGEMENT FOR HOLDING A FIRST FASTENING ELEMENT AND A SECOND FASTENING ELEMENT ON AN AXLE ELEMENT FOR A MOTOR VEHICLE AXLE

BACKGROUND AND SUMMARY OF THE INVENTION

Exemplary embodiments of the present invention to an arrangement for holding a first fastening element and a second fastening element on an axle element for a motor vehicle axle.

German patent document DE 198 56 706 C1 discloses a fastening of a vehicle axle on an axle suspension of a vehicle, in particular of a utility vehicle, with an element serving as a spring saddle, which is arranged on the upper side of the vehicle axle and which supports an axle spring of the axle suspension. The fastening is particularly suited for tensioning a leaf spring assembly. It comprises an element serving as a counter plate, which is arranged on the underside of the vehicle axle and on which are fastened spring clamps engaging around the vehicle axle for the pretensioned fastening of the axle spring on the vehicle axle. Provision is made of two angled parts, which each have a vertical section and a horizontal section, wherein the vertical sections are each laterally fixed on the vehicle axle in the region of a neutral axis for vertical bending loads of the vehicle axle. The horizontal section of one of the angled parts rests on top of the vehicle axle and forms or bears the spring saddle. The horizontal section of the other angled part rests on the bottom of the vehicle axle and forms or bears the counter plate.

Exemplary embodiments of the present invention provide a particularly advantageous arrangement for holding a first fastening element and a second fastening element on an axle element for an axle of a vehicle, especially of a utility vehicle.

This is achieved with an arrangement for holding a first fastening element and a second fastening element on an axle element for a motor vehicle axle.

With such an arrangement for holding a first fastening element and a second fastening element on an axle element, in particular on an axle bridge, for an axle of a motor vehicle, of a utility vehicle in particular, the first fastening element is held on the axle element. The first fastening element is thus arranged on a first side of the axle element. The first fastening element thus serves as a spring saddle, which is intended to support a spring mechanism, in particular a spring assembly, of the axle. In other words the first fastening element is used for supporting the spring mechanism on the axle element (axle bridge).

The second fastening element is arranged on a second side of the axle element facing away from the first side. The second fastening element serves as a counter plate, which is used to support at least one bracket engaging around the axle element and intended for fastening the spring mechanism on the axle element. Thus, the second fastening element is also held on the axle element. Obviously a holding arrangement is also achievable by means of just one fastening means, for example by means of a holding bracket engaging around the axle element.

According to the invention, at least one of the fastening elements is joined to the axle element by means of at least one welding rivet. Preferably the second fastening element (counter plate) is joined to the axle element by means of at least one welding rivet. A desired positioning of the second fastening element relative to the axle element is thereby achieved prior to the mounting of the spring mechanism on the axle element and also prior to the mounting of the axle element on the motor vehicle. This precise alignment of the second fastening element relative to the axle element also permits an expedient and cost-effective mounting of both the bracket and the spring mechanism, since the second fastening element has already been positioned and thus no effort is required for aligning or holding the second element during assembly.

Another advantage of the connection of the second fastening element to the axle element by the joining with the at least one welding rivet is that doing so prevents an undesired shifting out of place of the second fastening means, the bracket, and the spring mechanism and thus an undesired movement thereof relative to the axle element before the spring mechanism is finally fixed via the at least one bracket on the second fastening element and via the latter on the axle element. This fixing is achieved, for example, by tightening at least one screw element to a predetermined torque.

Preferably at least two welding rivets are provided, by means of which the second fastening means is joined to the axle element. The second fastening element can thus be aligned and positioned very precisely, accurately, and clearly relative to the axle element. Furthermore, an undesired relative movement of the second fastening element in relation to the axle element, in particular during the mounting of the spring mechanism and/or of the bracket, is avoided. Provision can easily be made of a different, in particular of a greater number of welding rivets for joining the second fastening element to the axle element.

As a bracket, preference is given to using a spring clamp, which serves for the pretensioned fastening of the axle mechanism (spring assembly) to the axle element (axle bridge) via the second fastening element.

In an advantageous embodiment of the invention, the at least one welding rivet is arranged on the second side. Provision can thus be made such that the welding rivet, at least in regions, is received in respective receiving openings arranged on the second side of the axle element and in corresponding receiving openings of the second fastening element. This keeps the weight of the holding arrangement of the invention especially light, since the second fastening element does not have to engage around the axle element on at least one other side and does not have to extend, for example, to the neutral axis of the axle element in order to weld, for instance, the second fastening element to the axle element at least close to the neutral axis. It is thus possible to use less material to form the second fastening element, thus resulting in a light weight of said second fastening element.

With the holding arrangement of the invention it is furthermore possible to configure the second element as, for example, a cast component and/or as a forged component, which keeps the weight of the second fastening element and thus of the entire holding arrangement of the invention within a particularly low range. It is likewise possible to use hard-to-weld material for the second fastening element, thereby enabling, for example, sound proofing. Hence the holding arrangement of the invention has particularly advantageous noise characteristics.

In another advantageous embodiment of the invention, the first fastening element (spring saddle) is also joined to the axle element by means of at least one other welding rivet. Thus, the first fastening element can also be aligned relative to and fastened to the axle element in a particularly advantageous manner in order to prevent an unwanted relative movement of the first fastening element in relation to the axle element. Hence all of the embodiments and advantages described with regard to the second fastening element also apply to the first fastening element.

In the design it is likewise possible to space the first fastening element and/or connection zones of the first fastening element and of the axle element relatively far from the neutral axis thereof such that the first fastening element can also be configured with relatively compact dimensions. This keeps the amount of material used to produce the first fastening element and hence the weight thereof especially low, thus resulting in a light weight of the holding arrangement of the invention as a whole. The holding arrangement of the invention can also be used with an air suspension as the spring mechanism or with any other suspension mechanism.

A particular advantage of the holding arrangement of the invention resides in the fact that the joining of the first and/or of the second fastening means to the axle element by means of the at least one welding rivet in each case allows an almost unlimited selection of parts to be joined, which can be used for both cost and function optimization. Hence difficult-to-weld and non-weldable materials can also be used for the first and/or for the second fastening element and still be joined to the axle element such that the first and/or the second fastening element can be fastened to and aligned relative to the axle element. As has already been indicated, it is thus possible to use materials for achieving a noise decoupling effect such that, for example, an axle drive of the axle can be connected to the chassis of the vehicle via the axle element in at least an essentially sound-proof manner. This conveys particularly advantageous noise characteristics of the motor vehicle.

Furthermore, the axle element can also be painted underneath the fastening elements, since for example with very little effort, for instance by means of a drill, welding preparations can be made after painting in order to join the fastening parts or at least the second fastening part to the axle element after said painting. Since only relatively small welding surfaces are needed for the joining technique with the welding rivet, this is advantageously the case.

Other advantages, features, and details of the invention will emerge from the following description of preferred exemplary embodiments and with reference to the drawing. The features and combinations of features initially mentioned in the description as well as the features and combinations of features subsequently mentioned in the description of the figures and/or illustrated in just the figures can not only be used in each specified combination but also in other combinations or independently without exceeding the scope of the invention. Use of the holding arrangement of the invention is not limited to motor vehicles.

BRIEF DESCRIPTION OF THE DRAWING FIGURES

Figure 8:
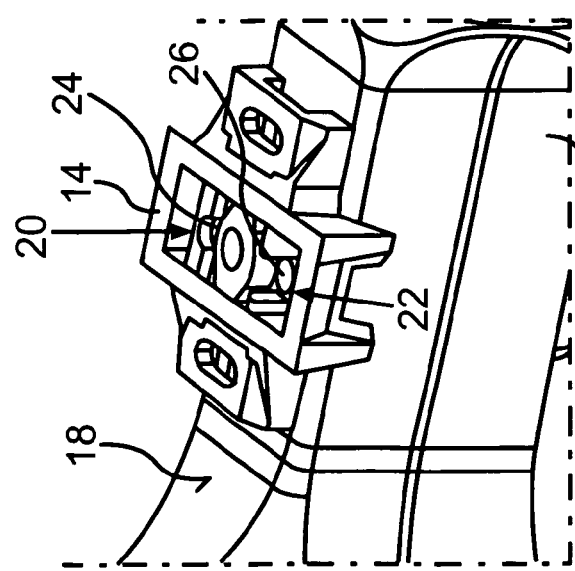

The drawing shows in:

FIG. 1 a schematic perspective view of a holding arrangement of counter plates on an axle bridge for an axle for a utility vehicle;

FIG. 2 a sectional schematic perspective view of the holding arrangement of FIG. 1;

FIG. 3 a schematic perspective view of the holding arrangement of FIG. 1 and FIG. 2 in which spring saddles are also held on the axle bridge;

FIG. 4 a schematic cross-sectional view of the holding arrangement of FIG. 3;

FIG. 5a-b a schematic cross-sectional view and a schematic perspective view of an embodiment of a spring saddle for the holding arrangement of FIG. 3 and FIG. 4;

FIG. 6a-b a schematic cross-sectional view and a schematic perspective view of another embodiment of the spring saddle as in FIG. 5a-b;

FIG. 7a-b a schematic cross-sectional view and a schematic perspective view of another embodiment of the spring saddle as in FIGS. 5a-6b;

FIG. 8 a sectional schematic perspective view of the holding arrangement of FIG. 2;

FIG. 9 a sectional schematic perspective view of another embodiment of the holding arrangement of FIG. 3; and FIG. 10a-b in each case a schematic perspective view illustrating a technique for producing the connection arrangement of FIG. 8, in which the axle bridge is joined to the counter plate by means of two welding rivets.

DETAILED DESCRIPTION

FIG. 1 shows a holding arrangement 10 of counter plates 12, 14 on an axle bridge 16 for an axle of a utility vehicle. As illustrated in FIG. 1, the counter plates 12, 14 are arranged on a first side 18 of the axle bridge 16 and rest directly on the axle bridge 16. In other words the counter plates 12, 14 contact the axle bridge 16. Each counter plate 12, 14 is for fastening two spring clamps on the axle bridge 16, each of the clamps engaging, at least partially, around the axle bridge 16. In other words the counter plates 12, 14 are used to fasten the respective spring clamps on the axle bridge 16, and the counter plates 12, 14 can be used to support said spring clamps on the axle bridge 16. The spring clamps in turn serve for holding a spring assembly on the axle bridge 16.

As illustrated in FIG. 8 in particular, the counter plates 12, 14 have respective through-openings 20, 22, each of which receives, at least in regions, a welding rivet 24, 26. Corresponding to the through-openings 20, 22 are respective through-openings of the axle bridge 16, which likewise receive, at least in regions, the respective welding rivets 24, 26. The counter plates 12, 14 are thus joined to the axle bridge 16 by means of the respective welding rivets 24, 26. This has the advantage that the counter plates 12, 14 are aligned precisely in relation to the axle bridge 16 and consequently an undesired shifting out of place thereof relative to the axle bridge 16 is no longer possible. This furthermore has the advantage that an undesired movement of the spring assembly and of the spring clamps relative to the axle bridge 16 is likewise no longer possible. Another advantage is that the counter plates 12, 14 can be configured with particularly compact dimensions since they do not have to extend to a neutral axis of the axle bridge 16, in the vicinity of which they would possibly have to be welded to the axle bridge 16. This keeps the weight of the counter plates 12, 14 and thus of the entire holding arrangement 10 particularly light. Thus the counter plates 12, 14 are connected to the axle bridge 16 on the first side 18 only. Hence they do not have to extend to the neutral axis.

FIGS. 3, 4, and 9 illustrate other embodiments of the holding arrangement 10, wherein provision is made of respective spring saddles 28, 30 corresponding to the counter plates 12, 14. The respective spring assemblies can be supported via the spring saddles 28, 30. In other words by using the spring saddles 28, 30, the respective spring assemblies can be supported on the axle bridge 16 and fixed by means of the spring clamps. By the welding of the counter plates 12, 14 to the axle bridge 16 by means of the respective welding rivets 24, 26, position information can also be conveyed between the counter plates 12, 14 and the spring saddles 28, 30 such that a particularly advantageous positioning relative to the axle bridge 16 is possible.

As illustrated in FIGS. 5a-7a and 9 in particular, each spring saddle 28, 30 also has two through-openings 32, 34. Through-openings of the axle bridge 16 correspond to the through-openings 32, 34 such that the respective through-openings can receive, at least partially, respective welding rivets 36, 38. By means of the respective welding rivets 36, 38 it is therefore also possible to join the spring saddles 28, 30 to the axle bridge 16 and to position them relative to and fix them on the axle bridge in a particularly advantageous manner.

The spring saddles 28, 30 are arranged on a second side 40 facing away from the first side 18. The welding rivets 36, 38 and also the corresponding through-openings of the spring saddles 28, 30 and of the axle bridge 16 are arranged on the second side 40. Hence the spring saddles 28, 30 are connected to the axle bridge 16 only on the second side 40. This means that the spring saddles 28, 30 likewise do not have to extend to the neutral axis of the axle bridge 16, where they could possibly be welded to the axle bridge 16. Hence the spring saddles 28, 30 can also be configured with particularly compact dimensions, resulting in a very light weight of the spring saddles 28, 30 and thus in a very light weight of the holding arrangement 10 as a whole.

FIGS. 10a-b illustrate a possibility of joining the counter plates 12, 14 to the axle bridge 16 by means of the respective welding rivets 24, 26. To this end, provision is made of a weld edge 42 on which is arranged the axle bridge 16 with the counter plate 12.

In lieu of the through-openings of the axle bridge 16 given here as an example, in another embodiment only welding points for the fastening of welding studs are provided, wherein the welding studs do not require any particular pre-machining. Paint coats, if any, can be removed before fastening a welding stud to a welding point.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A holding arrangement for a motor vehicle axle comprising:
   a first fastening element; and
   a second fastening element,
   wherein the first fastening element is arranged on a first side of an axle element of the motor vehicle axle, is configured to support a spring mechanism of the axle, and is held on the axle element,
   wherein the second fastening element is arranged on a second side of the axle element, facing away from the first side, is configured to support a bracket engaging, at least partially, around the axle element, is configured to fasten the spring mechanism on the axle element, and is held on the axle element,
   wherein at least one of the first and second fastening elements is joined to the axle element by at least one welding rivet.

2. The holding arrangement according to claim 1, wherein the second fastening element is joined to the axle element by the at least one welding rivet.

3. The holding arrangement according to claim 1, wherein the at least one welding rivet is arranged on the second side.

4. The holding arrangement according to claim 1, wherein the at least one welding rivet is received, at least in regions, in respective receiving openings arranged on the second side of the axle element and in corresponding receiving openings of the second fastening element.

5. The holding arrangement according to claim 1, wherein the first fastening element is joined to the axle element by the at least one welding rivet.

6. The holding arrangement according to claim 5, wherein the at least one welding rivet is arranged on the first side.

7. The holding arrangement according to claim 5, wherein the at least one welding rivet is received, at least in regions, in respective receiving openings arranged on the first side of the axle element and in corresponding receiving openings of the first fastening element.

\* \* \* \* \*